United States Patent [19]

Yoshino

[11] Patent Number: 4,682,932
[45] Date of Patent: Jul. 28, 1987

[54] INDUSTRIAL ROBOT
[75] Inventor: Shigeru Yoshino, Kodaira, Japan
[73] Assignee: Silver Seiko Limited, Kodaira, Japan
[21] Appl. No.: 640,696
[22] Filed: Aug. 14, 1984
[30] Foreign Application Priority Data
Aug. 18, 1983 [JP] Japan ............................ 58-126840[U]
[51] Int. Cl.⁴ ............................................. B25J 17/00
[52] U.S. Cl. .................................. 414/744 A; 901/21; 901/28
[58] Field of Search ............... 414/744 R, 744 A, 749, 414/751, 744 B, 744 C; 901/21, 15, 14, 27, 28
[56] References Cited
U.S. PATENT DOCUMENTS
4,062,601 12/1977 Pardo et al. ..................... 901/28 X
4,392,776 7/1983 Shum ............................... 901/21 X
FOREIGN PATENT DOCUMENTS
186289 11/1982 Japan .

Primary Examiner—Robert J. Spar
Assistant Examiner—Donald W. Underwood
Attorney, Agent, or Firm—Cushman, Darby & Cushman

[57] ABSTRACT

An industrial robot of the horizontal multi-articulation type includes a vertical shaft providing an articulation between a first arm and a second arm. The shaft is supported for rotation at a fixed vertical position on the first arm while the second arm is removably secured through clamping to an end portion of the vertical shaft second arm which projects downwardly from the first arm. The bottom end of the shaft is supported by a removable bearing plate. A pulley operatively connected to a motor is mounted for rotation on the shaft, and a speed reduction gear is interposed between the pulley and the shaft so that the shaft and hence the second arm are angularly rotated by the motor at a very low speed relative to the speed of the motor. In this arrangement, the second arm can be easily mounted and removed on and from the shaft and hence the first arm.

7 Claims, 2 Drawing Figures

INDUSTRIAL ROBOT

BACKGROUND OF THE INVENTION

This invention relates to an industrial robot of the horizontal multi-articulation type wherein a second arm is mounted for pivotal motion about a vertical axis at an end of a first arm which is in turn mounted at the other end thereof for pivotal motion about another vertical axis at a stationary member.

A typical one of industrial robots of the type described above is disclosed, for example, in Japanese Laid-Open Utility Model No. 57-186289. In this arrangement, a speed reduction gear is fitted around an input power shaft by way of a speed reduction gear securing block, and a housing secured to a second arm is provided around the speed reduction gear and is fitted between upper and lower projections at an end of the first arm. Accordingly, in assembling operations of the second arm of the arrangement, the housing which is integral with the second arm and in which the speed reduction gear is incorporated is first fitted laterally into the end portion of the first arm, and then the input power shaft is inserted into the housing and is fitted in the speed reduction gear whereafter a pulley is fitted on the input power shaft and a belt is mounted on the pulley. In this way, very complicated and time consuming operations are required for such mounting and adjustment. In addition, for example, when the second arm is to be removed due to a trouble to or for adjustment of the speed reduction gear and so on, the belt must be first removed reversely and the input power shaft must then be pulled off before removal of the second arm. Thus, the conventional arrangement has several defects in structure principally for assembling of the same.

SUMMARY OF THE INVENTION

Accordingly, it is an object of the present invention to provide a practical industrial robot which eliminates such defects of conventional industrial robots as described above and wherein assembling and disassembling of a second arm to and from a first arm can be effected simply and rapidly from below.

According to the present invention, there is provided an industrial robot of the type which includes a first arm having one end supported for pivotal motion about a first vertical axis, a second arm having one end supported for pivotal motion about a second vertical axis at the other end of the first arm, and a motor for pivoting the second arm, comprising: a shaft providing the second axis; means for supporting the shaft for rotation at a fixed vertical position at the other end of the first arm; means for removably securing the shaft to the one end of the second arm; and a speed reduction gear for transmitting rotation of the motor to the shaft at a reduced speed.

The present invention will now be described in detail in connection with a preferred embodiment shown in the drawings.

DETAILED DESCRIPTION OF THE INVENTION

Figure 1:
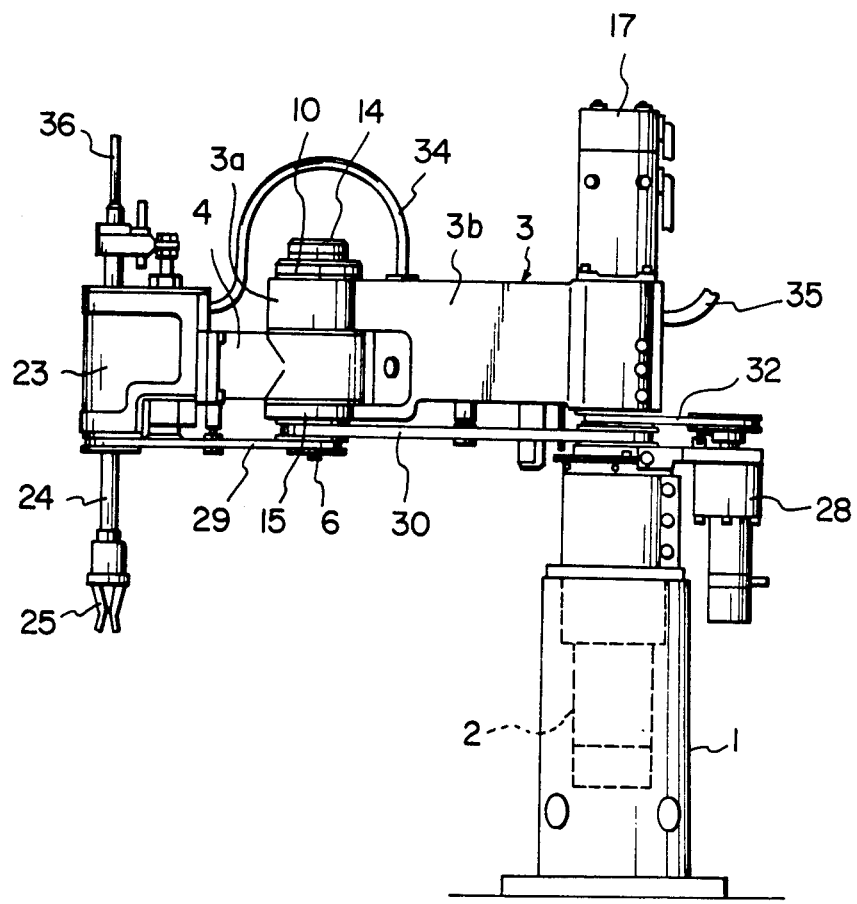
FIG. 1 is a side elevational view of an industrial robot to which the present invention is applied.
Figure 2:
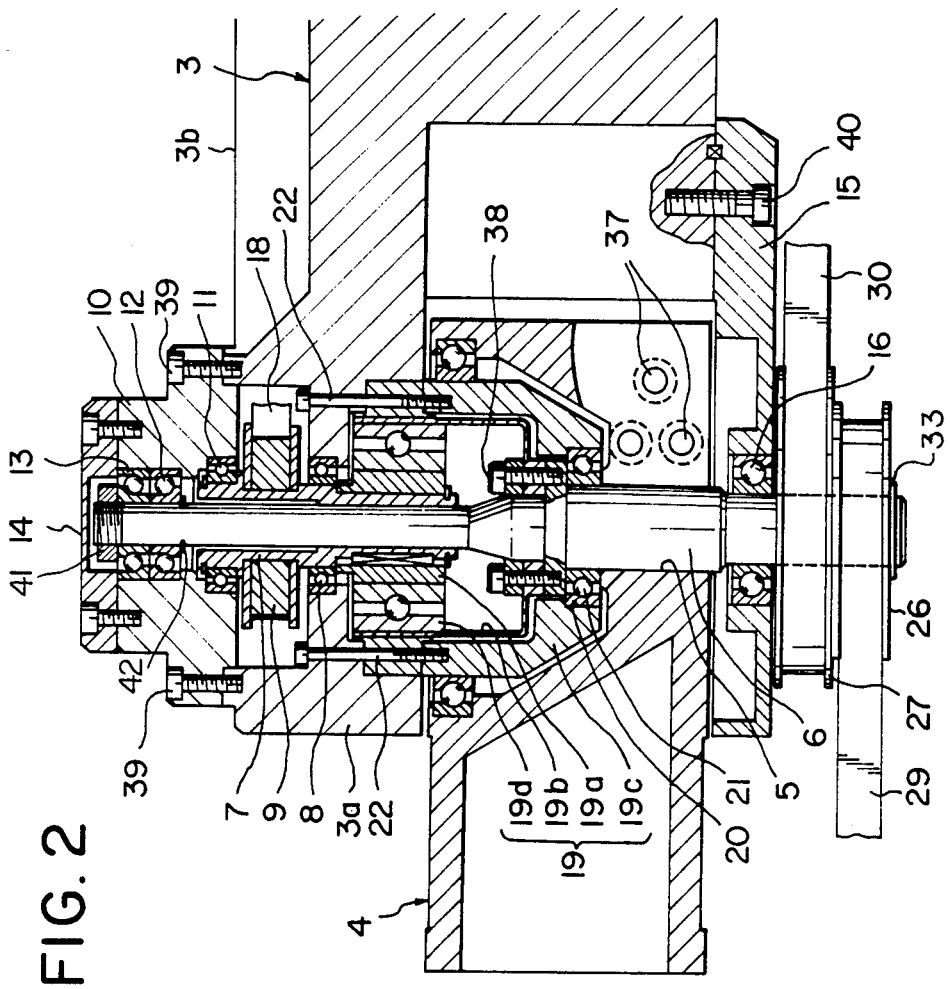
FIG. 2 is an enlarged vertical sectional view of a second arm pivotally supported on a first arm of the robot.

An industrial robot of the embodiment is formed as an assembling robot and includes a cylindrical base member 1 in which a motor 2 is contained. A first arm 3 is mounted at a base end thereof on a top end of a drive shaft (not shown) connected to be rotated by the motor 2 so that forward or reverse rotation of the motor 2 will pivot the first arm 3 within a horizontal plane.

A second arm 4 is mounted on the other end of the first arm 3 and has a shaft hole 5 formed in a base end portion thereof. The second arm 4 further has a vertical slit formed contiguously to said shaft hole 5 to thus define a pair of extensions. A shaft 6 extends vertically through the shaft hole 5 and is removably secured to the second arm 4 by means of clamping screws 37 which extend across and fasten the extensions of the second arm 4 together to secure the second arm 4 to the shaft 6. A sleeve 7 is fitted around an upper portion of the shaft 6 and is rotatably supported at top and mid portions thereof by means of ball bearings 11 and 8 which are secured to a bearing plate 10 and an outer extension or bearing section 3a of the end of the first arm 3, respectively. A pulley 9 is secured to a portion of the sleeve 7 between the bearings 11 and 8.

The bearing plate 10 is secured to the top of the bearing section 3a of the first arm 3 by means of fastening screws 39. The ball bearing 11 and further ball bearings 12 and 13 are fitted in a bearing hole of and secured, at respective outer races thereof, to the bearing plate 10 while inner races of the ball bearings 12 and 13 are secured to an upper extension of the shaft 6 which projects upwardly from the sleeve 7. The upper extension of the shaft 6 is threaded adjacent the top end thereof and a nut 41 is screwed on the threaded top end of the shaft and cooperates with a snap ring 42 secured just below the ball bearing 11 to fasten the ball bearings 11 and 12 in order that the shaft 6 may be supported against movement in an axial or vertical direction. Thus, the shaft 6 can rotate around its own vertical axis but cannot move in any axial direction. A cover 14 is screwed to an upper face of the bearing plate 10 and covers the top end of the shaft 6.

Another bearing plate or bracket 15 is secured to a bottom face of the end of the first arm 3 by means of fastening screws 40 (only one is shown) and extends in parallel and opposing relationship to the bearing section 3a of the first arm 3. A ball bearing 16 is fitted in a bearing hole of and secured to the bearing plate 15, and a lower end portion of the shaft 6 is supported for rotation on the ball bearing 16 and against lateral movement. Thus, the second arm 4 is supported at the base end thereof for pivotal motion at the outer end of the first arm 3 by means of the shaft 6.

A motor 17 for driving the second arm 4 is located above a base end of the first arm 3 and has a vertical axis of rotation which is preferably in line with the axis of pivotal motion of the first arm 3 and also with the axis of rotation of the motor 2 for the first arm 3. An endless belt 18 is located within a cover 3b provided at a base end portion of the first arm 3 and extends between the pulley 9 and another pulley (not shown) on an output power shaft (not shown) of the motor 17 so that forward or reverse rotation of the motor 17 will rotate the pulley 9 and the sleeve 7 in a corresponding direction.

A speed reduction gear generally designated at 19 is located below the pulley 9 and is adapted to transmit rotation of the pulley 9 to the shaft 6 at a reduced speed of a high ratio. Thus, the speed reduction gear 19 may conveniently be a known harmonic drive speed reduction gear including a rotary member or wave generator 19a serving as a driving member, a flex spline 19b serving as a driven member, and a circular spline 19c serving as a fixed member.

The rotary member 19a is made as a solid body and has an elliptical shape in plan view. A flexible ball bearing 19d is fitted around an outer periphery of the rotary member 19a and has a bearing hole formed in the center thereof. A lower half portion of the sleeve 7 is fitted in the bearing hole of the ball bearing 19d and is fixed thereto.

The flex spline 19b is made as an elastic deformable member and is in the form of a cup having a circular shape in top plan view. The flex spline 19b has teeth formed on an outer periphery of an upper portion thereof and has a bearing hole formed in the center of a bottom portion thereof. The shaft 6 is fitted in the bearing hole of the flex spline 19b and is secured thereto by means of screws 38. The upper portion of the flex spline 19b is closely contacted with the outer periphery of the flexible ball bearing 19d so that it is deformed in an elliptical shape.

The circular spline 19c is made as a rigid member and is in the form of a cup having a circular shape in top plan view. The circular spline 19c has teeth formed on an inner periphery of an upper portion thereof, and the teeth of the flex spline 19b are meshed with teeth of the circular spline 19c. A bearing hole 20 is formed in the center of a bottom portion of the circular spline 19d, and a ball bearing 21 which is fitted on the shaft 6 is in turn fitted in the bearing hole 20 of the circular spline 19c. An upper end face of the circular spline 19c is secured to a lower face of the bearing section 3a of the first arm 1 by means of screws 22.

The teeth of the circular spline 19c are greater by two in number than the teeth of the flex spline 19b.

Thus, as the pulley 9 is rotated at a high speed, the rotary member 19a is rotated in integral relationship. During this rotation, the teeth of the flex spline 19b are engaged one after another with the teeth of the circular spline 19c, and due to the difference in number of the teeth, the flex spline 19b is rotated at a corresponding reduced speed, as well known in the art. Rotation of the flex spline 19b rotates the shaft 6 in integral relationship which thus pivots the second arm 4 in a horizontal plane.

Mounted at an end of the second arm 4 is a hand unit 23 which includes a shaft 24 supported for rotation and for up and down motion and a grip 25 provided at the bottom end of the shaft 24. The grip 25 may be operated by compressed air which is supplied by way of an air hose 36.

A cable 34 extends from the first arm 3 to the hand unit 23, and signal lines in the cable 34 may be electrically connected to electrical elements such as sensors provided in the hand unit 23. The cable 34 is connected to a main cable 35 which further includes power lines connecting the motors 2, 17 and 28 to a power source not shown. The main cable 35 may include additional signal or power lines therein.

A pulley is mounted for integral rotation on and relative to the shaft 24, and a belt 29 extends between the pulley and another pulley 26 which is mounted for rotation on the shaft 6 adjacent the lower end of the shaft 6. A further pulley 27 is mounted for integral rotation with the pulley 26, and the pulleys 26 and 27 are held in position on the shaft 6 by suitable means such as a snap ring 33. Another belt 30 extends between the pulley 27 and one of integral paired pulleys which are operatively connected to a motor 28 by means of a further belt 32. The motor 28 is mounted on and located on one side of the base member 1. Thus, angular rotation of the motor 28 will angularly rotate the shaft 24 of the grip 25 to correct the orientation of a work gripped by the grip 25.

In this arrangement, the second arm 4 can be easily disassembled from the first arm 3: the snap ring 33 for the pulleys 26 and 27 is first removed from the shaft 6 and the pulleys 26 and 27 are pulled downwardly off the shaft 6; then the screws 40 are removed and the bearing plate 15 is pulled down; and thus by merely loosening the clamping screws 37, the second arm 4 can be pulled downwardly off the shaft 6 and thus off the first arm 3. Also, assembling of the second arm 4 can be easily effected by following the steps in the reverse manner.

What is claimed is:

1. An industrial robot of the type which includes a first arm having one end supported for pivotal motion about a first vertical axis, a second arm having one end supported for pivotal motion about a second vertical axis at the other end of said first arm, and a motor for pivoting said second arm, comprising:
   a shaft providing said second axis;
   means for supporting said shaft for rotation at a fixed vertical position at asid the other end of said first arm;
   means for removably securing said shaft to said one end of said second arm;
   a speed reduction gear for transmitting rotation of said motor to said shaft at a reduced speed;
   said speed reduction gear being a harmonic speed reduction gear including a flex spline secured to said shaft, a circular spline secured to said first arm, and a wave generator operatively connected to said motor for engaging said flex spline with said circular spline at consecutive different circumferential positions during rotation of said wave generator, and
   further comprising a sleeve supported for rotation relative to said first arm and about said shaft, said wave generator being secured to said sleeve, and a pulley secured to said sleeve and operatively connected to said motor for transmitting rotation of said motor to said wave generator of said speed reduction gear.

2. In an industrial robot of the type which includes a first arm having one end supported for pivotal motion about a first vertical axis, a second arm having one end supported for pivotal motion about a second vertical axis at the other end of said first arm, and a motor for pivoting said second arm, comprising:
   a shaft providing said second axis;
   means for supporting said shaft for rotation at a fixed vertical position at said other end of said first arm and including axially spaced first and second bearings;
   a speed reduction gear for transmitting rotation of said motor to said shaft at a reduced speed, said speed reduction gear circumscribing said shaft between said first and second bearings;
   means for removably fixing said second bearing to said first arm; and means for removably securing said one end of said second arm to said shaft between said speed reduction gear and said second bearing whereby said second arm may be removed from said shaft and said first arm by removal of said second bearing, release of said removable securing means, and axial displacement of said second arm towards the end of said shaft normally supported by said second bearing.

3. An industrial robot as claimed in claim 2, wherein said shaft has a lower end portion projected downwardly from said other end of said first arm and said second arm is secured to said lower end portion of said shaft by said means for removably securing, said means for removably securing comprising fasteners which clamp said second arm onto said lower end portion of said shaft, whereby removal of said second arm from said first arm is accomplished only loosening said means for removably securing said second arm to said shaft and axially displacing said second arm along said shaft in the direction of the second bearing location.

4. An industrial robot as claimed in claim 3, wherein said means for removably fixing said second bearing comprises a bracket removably mounted on said first arm adjacent said the other end of said first arm, said second bearing being mounted on said bracket for rotatably supporting said shaft against lateral movement.

5. An industrial robot as claimed in claim 3, further comprising an integral pulley pair mounted on said shaft adjacent the projected end of said shaft and constituting part of a transmission mechanism for transmitting rotation of another motor mounted adjacent said one end of said first arm to means on the other end of said second arm, and means for removably attaching said pulley pair to the projected end of said shaft.

6. An industrial robot as claimed in claim 2, wherein said motor is located adjacent said one end of said first arm, and further comprising a pulley mounted for rotation about said shaft, and a belt for transmitting rotation of said motor to said pulley.

7. An industrial robot as claimed in claim 4, further comprising two integral pulleys mounted for rotation on said shaft adjacent the projected end of said shaft and constituting part of a transmission mechanism for transmitting rotation of another motor mounted adjacent said one end of said first arm to means on the other end of said second arm.

* * * * *